United States Patent
Lee et al.

(10) Patent No.: US 11,123,953 B2
(45) Date of Patent: *Sep. 21, 2021

(54) MULTILAYER FILMS AND METHODS THEREOF

(71) Applicant: Dow Global Technologies LLC, Midland, MI (US)

(72) Inventors: Jong Young Lee, Sugar Land, TX (US); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/749,953

(22) PCT Filed: Aug. 10, 2016

(86) PCT No.: PCT/US2016/046248
§ 371 (c)(1),
(2) Date: Feb. 2, 2018

(87) PCT Pub. No.: WO2017/039986
PCT Pub. Date: Mar. 9, 2017

(65) Prior Publication Data
US 2018/0229472 A1    Aug. 16, 2018

Related U.S. Application Data

(60) Provisional application No. 62/212,161, filed on Aug. 31, 2015.

(51) Int. Cl.
| | |
|---|---|
| *B32B 7/06* | (2019.01) |
| *B32B 7/12* | (2006.01) |
| *B32B 27/06* | (2006.01) |
| *B32B 1/00* | (2006.01) |
| *B29C 48/88* | (2019.01) |
| *B29C 48/10* | (2019.01) |
| *B29C 48/21* | (2019.01) |
| *B29C 48/00* | (2019.01) |
| *B32B 1/08* | (2006.01) |
| *B32B 7/02* | (2019.01) |
| *B32B 37/15* | (2006.01) |
| *B32B 27/08* | (2006.01) |
| *B32B 27/32* | (2006.01) |
| *B29C 48/92* | (2019.01) |
| *B29K 23/00* | (2006.01) |
| *B29L 9/00* | (2006.01) |
| *B29L 23/00* | (2006.01) |

(52) U.S. Cl.
CPC .............. *B32B 7/06* (2013.01); *B29C 48/022* (2019.02); *B29C 48/10* (2019.02); *B29C 48/21* (2019.02); *B29C 48/912* (2019.02); *B32B 1/00* (2013.01); *B32B 1/08* (2013.01); *B32B 7/02* (2013.01); *B32B 7/12* (2013.01); *B32B 27/06* (2013.01); *B32B 27/08* (2013.01); *B32B 27/32* (2013.01); *B32B 37/153* (2013.01); *B29C 48/92* (2019.02); *B29C 2948/92704* (2019.02); *B29K 2023/0625* (2013.01); *B29K 2023/0633* (2013.01); *B29L 2009/00* (2013.01); *B29L 2023/001* (2013.01); *B32B 2250/02* (2013.01); *B32B 2250/242* (2013.01); *B32B 2270/00* (2013.01); *B32B 2274/00* (2013.01); *B32B 2307/10* (2013.01); *B32B 2307/72* (2013.01); *B32B 2307/732* (2013.01); *B32B 2307/748* (2013.01); *B32B 2323/04* (2013.01); *B32B 2323/046* (2013.01); *B32B 2439/70* (2013.01); *B32B 2553/00* (2013.01); *B32B 2597/00* (2013.01)

(58) Field of Classification Search
None
See application file for complete search history.

(56) References Cited

U.S. PATENT DOCUMENTS

| | | |
|---|---|---|
| 3,318,538 A | 5/1967 | Needham |
| 4,599,392 A | 7/1986 | McKinney et al. |
| 5,272,236 A | 12/1993 | Lai et al. |
| 6,100,341 A * | 8/2000 | Friedman ............ C08L 23/0815 525/240 |
| 6,486,284 B1 | 11/2002 | Karande et al. |
| 6,521,338 B1 | 2/2003 | Maka |
| 7,498,282 B2 | 3/2009 | Patel et al. |

(Continued)

FOREIGN PATENT DOCUMENTS

| | | |
|---|---|---|
| WO | 9846672 A3 | 1/1999 |
| WO | 9951433 A1 | 10/1999 |

(Continued)

OTHER PUBLICATIONS

Dow Attane(R) 4404: https://www.dow.com/en-us/pdp.attane-4404g-ultra-low-density-polyethylene-copolymer.7647z.html (Year: 2011).*
Dow Flexomer(R) DFDB-9042 NT: http://iigc.mx/paginas/productos/pdf/lldpe_flexomer_dfdb_9042_nt_dow.pdf (Year: 2002).*
PCT/US2016/046248, International Search Report and Written Opinion dated Feb. 2, 2016.

(Continued)

*Primary Examiner* — Frank J Vineis
*Assistant Examiner* — Nicole T Gugliotta

(57) ABSTRACT

Embodiments disclosed herein include multilayer films having a cling layer and a release layer, wherein the cling layer comprises (i) an ethylene/alpha-olefin elastomer, and (ii) a polyethylene polymer selected from ultra-low density polyethylene, a very low density polyethylene, or combinations thereof, and the release layer comprises a low density polyethylene (LDPE) having a density of from 0.915 to 0.930 g/cc, a melt index, $I_2$, of from 1.0 to 30.0 g/10 min, and a molecular weight distribution, (Mw/Mn), as measured by the conventional calibration of triple detector gel permeation chromatography, of from 3.0 to less than 7.0.

15 Claims, No Drawings

(56) References Cited

U.S. PATENT DOCUMENTS

| | | |
|---|---|---|
| 7,608,668 B2 | 10/2009 | Li Pi Shan et al. |
| 8,372,931 B2 | 2/2013 | Hermel-Davidock et al. |
| 8,859,704 B2 | 10/2014 | Karjala et al. |
| 9,068,032 B2 | 6/2015 | Karjala et al. |
| 9,303,107 B2 | 4/2016 | Karjala et al. |
| 2008/0038571 A1 | 2/2008 | Klitzmiller et al. |
| 2008/0176981 A1 | 7/2008 | Biscoglio et al. |
| 2008/0274307 A1* | 11/2008 | Chereau .............. B32B 27/12 428/17 |
| 2011/0311792 A1 | 12/2011 | Batra et al. |
| 2012/0244327 A1* | 9/2012 | Hernandez ............ B32B 7/02 428/213 |
| 2013/0101775 A1* | 4/2013 | Dennison ............ B32B 27/08 428/41.3 |
| 2014/0094583 A1 | 4/2014 | Karjala et al. |
| 2014/0248480 A1 | 9/2014 | Vinck et al. |
| 2016/0108150 A1 | 4/2016 | Desjardins et al. |

FOREIGN PATENT DOCUMENTS

| | | |
|---|---|---|
| WO | 2004031049 A1 | 4/2004 |
| WO | 2005/023912 A3 | 3/2005 |

OTHER PUBLICATIONS

PCT/US2016/046248, International Preliminary Report on Patentability dated Mar. 6, 2018.

\* cited by examiner

MULTILAYER FILMS AND METHODS THEREOF

TECHNICAL FIELD

Embodiments of the present disclosure generally relate to multilayer films, and more particularly, to multilayer films having a high cling force and are substantially free of polyisobutylene (PIB).

BACKGROUND

Multilayer films are often used in packaging, and may package diverse items, such as, bulk farm materials like grass and hay to small grocery store items like meats and vegetables. For all of these items it is usually desirable to have a strong, stretchy film that has a sufficient level of tack or cling such that the film can releasably adhere to itself and/or an article that is wrapped with the film.

To achieve the desired level of cling, additives, such as PIB, may be incorporated into a cling layer to improve the tack of the cling layer. However, films that include such additives can have one or more drawbacks such as 1) being excessively noisy when unwound from a film-roll when utilized on a high speed wrapping machine, 2) having to be aged for a period of time so that the additive migrates to the surface of the film (i.e., blooms) during the aging period, 3) contaminating process equipment, and 4) causing two-sided cling when one-sided cling is desired. In addition, such additives can cause undue handling issues when they are in liquid form and drip to an undue degree from process equipment.

The multilayer films may also incorporate high levels of ethylene/alpha-olefin elastomers to achieve a higher level of tack or cling; however, ethylene/alpha-olefin elastomers can make the multilayer films very expensive. In addition, the films can be difficult to process using blown film techniques when ethylene/alpha-olefin elastomers are used at high levels (e.g., greater than 90% by weight in a cling layer) because of their tackiness.

Accordingly, alternative multilayer films may be desired having improved properties, such as, high cling and/or low noise, while also being cost-effective and/or relatively easy to fabricate using blown film techniques.

SUMMARY

Disclosed in embodiments herein are multilayer films. The multilayer films have a cling layer and a release layer. The cling layer comprises (i) an ethylene/alpha-olefin elastomer having a density in the range of 0.855 to 0.890 grams/cm$^3$ and a melt index ($I_2$) in the range of 0.1 to 30 grams/10 minutes; and (ii) a polyethylene polymer selected from ultra-low density polyethylene, a very low density polyethylene, or combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by the Crystallization Elution Fractionation (CEF) test method. The release layer comprises a low density polyethylene (LDPE) having a density of from 0.915 to 0.930 g/cc, a melt index, $I_2$, of from 1.0 to 30.0 g/10 min, and a molecular weight distribution, (Mw/Mn), as measured by the conventional calibration of triple detector gel permeation chromatography, of from 3.0 to less than 7.0.

Also disclosed in embodiments herein are methods of making multilayer films. The methods comprise coextruding a cling layer composition with a release layer composition in an extruder to form a tube having a cling layer and a release layer, and cooling the tube to form a multilayer film. The cling layer compositions comprises (i) an ethylene/alpha-olefin elastomer having a density in the range of 0.855 to 0.890 grams/cm$^3$ and a melt index ($I_2$) in the range of 0.1 to 30 grams/10 minutes; and (ii) a polyethylene polymer selected from ultra-low density polyethylene, a very low density polyethylene, or combinations thereof, wherein the polyethylene polymer has a density in the range 0.885 to 0.915 grams/cm$^3$, a melt index($I_2$) in the range of 0.1 to 30 grams/10 minutes, and a purge fraction greater than 20 percent as determined by the Crystallization Elution Fractionation (CEF) test method. The release layer composition comprises a low density polyethylene (LDPE) having a density of from 0.915 to 0.930 g/cc, a melt index, $I_2$, of from 1.0 to 30.0 g/10 min, and a molecular weight distribution, (Mw/Mn), as measured by the conventional calibration of triple detector gel permeation chromatography, of from 3.0 to less than 7.0.

Additional features and advantages of the embodiments will be set forth in the detailed description which follows, and in part will be readily apparent to those skilled in the art from that description or recognized by practicing the embodiments described herein, including the detailed description which follows, and the claims. It is to be understood that both the foregoing and the following description describe various embodiments and are intended to provide an overview or framework for understanding the nature and character of the claimed subject matter.

DETAILED DESCRIPTION

Reference will now be made in detail to embodiments of multilayer films and materials used to make such films. The multilayer films may be used in stretch-cling applications. It is noted, however, that this is merely an illustrative implementation of the embodiments disclosed herein. The embodiments are applicable to other technologies that are susceptible to similar problems as those discussed above. For example, the multilayer films described herein may be used as surface protection films, agricultural films, such as silage wrap, or in other flexible packaging applications, such as, shrink films, heavy duty shipping sacks, liners, sacks, stand-up pouches, detergent pouches, sachets, etc., all of which are within the purview of the present embodiments.

In embodiments described herein, the multilayer films comprise a cling layer and a release layer. Optionally, one or more core layers may be positioned between the cling layer and the release layer. The cling layer is an outer layer of the multilayer film that has a sufficient level of adhesive tack such that the cling layer of the multilayer film may form a releasable bond when brought into contact with a surface, such as, the surface of an article or the surface of the release layer. The release layer is an outer layer of the multilayer film that exhibits low adhesion to the cling layer. The release layer can allow for separation to occur between the cling layer/release layer interface on a roll such that the multilayer film may be unrolled from a spool without undue force or without the film tearing.

The thickness of the cling and release layers can vary over a wide range. In some embodiments, the cling layer may have a thickness that is from 5-50 percent of the overall thickness of the film, from 5-30 percent of the overall thickness of the film, or even from 10-30 percent of the overall thickness of the film. The release layer may have a thickness that is from 5-50 percent of the overall thickness of the film, from 5-30 percent of the overall thickness of the film, or even from 10-30 percent of the overall thickness of the film. In some embodiments, where one or more core layers are present, the one or more core layers may have a thickness that is from 0-90 percent of the overall thickness of the film, 10-90 percent of the overall thickness of the film, 20-90 percent of the overall thickness of the film, 30-90 percent of the overall thickness of the film, 40-90 percent of the overall thickness of the film, or 40-80 percent of the overall thickness of the film. The ratio of the thicknesses among a cling layer, a release layer, and any optional core layers can be any ratio that provides desirable properties such as cling, release, and the like. In some embodiments, a multilayer film can have a cling layer thickness, a core layer thickness, and a release layer thickness in a ratio in the range of 1:8:1 to 3:4:3.

Cling Layer

The cling layer may comprise an ethylene/alpha-olefin elastomer and a polyethylene polymer selected from ultra-low density polyethylene, a very low density polyethylene, or combinations thereof. In some embodiments, the cling layer comprises an ethylene/alpha-olefin elastomer and an ultra-low density polyethylene. In other embodiments, the cling layer comprises an ethylene/alpha-olefin elastomer and a very low density polyethylene. In further embodiments, the cling layer comprises an ethylene/alpha-olefin elastomer, an ultra-low density polyethylene, and a very low density polyethylene.

In embodiments described herein, the ethylene/alpha-olefin elastomers may comprise greater than 50%, by weight, of the units derived from ethylene. All individual values and subranges of greater than 50%, by weight, are included and disclosed herein. For example, the ethylene/alpha-olefin elastomer may comprise at least 60%, at least 70%, at least 80%, at least 90%, at least 92%, at least 95%, at least 97%, at least 98%, at least 99%, at least 99.5%, from greater than 50% to 99%, from greater than 50% to 97%, from greater than 50% to 94%, from greater than 50% to 90%, from 70% to 99.5%, from 70% to 99%, from 70% to 97%, from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5%, from 90% to 99%, from 90% to 97%, from 90% to 95%, from 93% to 99.9%, from 93% to 99.5%, from 93% to 99%, or from 93% to 97%, by weight, of the units derived from ethylene. The ethylene/alpha-olefin elastomer may comprise less than 50%, by weight, of units derived from one or more alpha-olefin comonomers. All individual values and subranges of less than 50%, by weight, are included herein and disclosed herein. For example, the ethylene/alpha-olefin elastomer may comprise less than 45%, less than 40%, less than 35%, less than 30%, less than 25%, less than 20%, less than 18%, less than 15%, less than 12%, less than 10%, less than 8%, less than 5%, less than 4%, less than 3%, from 0.2 to 15%, 0.2 to 12%, 0.2 to 10%, 0.2 to 8%, 0.2 to 5%, 0.2 to 3%, 0.2 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable alpha-olefin comonomers include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the alpha-olefin is selected from the group consisting of propylene, 1-butene, 1-pentene, 1-hexene, 4-methyl-1-pentene, 1-heptene, 1-octene, 1-nonene and 1-decene. In other embodiments, the alpha-olefin is selected from the group consisting of propylene, 1-butene, 1-hexene, and 1-octene. In further embodiments, the alpha-olefin is selected from the group consisting of 1-hexene and 1-octene.

Exemplary ethylene/alpha-olefin elastomers for use in a cling layer are commercially available under the trade names AFFINITY™ from the Dow Chemical Company, ENGAGE™ from the Dow Chemical Company, INFUSE™ from the Dow Chemical Company, EXACT from Exxon-Mobil Chemical, and TAFMER™ from Mitsui Chemicals, Inc. Suitable ethylene/alpha-olefin elastomers are further described in U.S. Pat. No. 5,272,236 (Lai et al.), U.S. Pat. No. 6,486,284 (Karande et al.), and U.S. Pat. No. 6,100,341 (Friedman), which are incorporated herein by reference.

Ethylene/alpha-olefin elastomers may be produced using single-site catalysts. Methods for producing olefin polymers using single site catalysts are described in U.S. Pat. No. 5,272,236 (Lai et al.) and U.S. Pat. No. 6,486,284 (Karande et al.), the entireties of which patents are incorporated herein by reference. Single-site catalyst systems may include metallocene catalysts and post-metallocene catalysts. In exemplary embodiments, the ethylene/alpha-olefin elastomer may be produced by a metallocene catalyst or a post-metallocene catalyst.

In some embodiments, the ethylene/alpha-olefin elastomer can include one or more olefin block copolymers. Olefin block copolymers are polymers comprising two or more chemically distinct regions or segments (referred to as "blocks") that may be joined in a linear manner, that is, a polymer comprising chemically differentiated units, which are joined end-to-end with respect to polymerized ethylenic functionality, rather than in pendent or grafted fashion. The blocks may differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Suitable olefin block copolymers are further described in U.S. Pat. No. 7,608,668, which is incorporated herein by reference.

In embodiments described herein, the ethylene/alpha-olefin elastomers have a density in the range of 0.855 to 0.890 grams/cc. All individual values and subranges of from 0.855 g/cc to 0.890 g/cc are included and disclosed herein. For example, in some embodiments, the ethylene/alpha-olefin elastomers may have a density of from 0.860 g/cc to 0.890 g/cc. In other embodiments, the ethylene/alpha-olefin elastomers may have a density of from 0.865 g/cc to 0.890 g/cc. Density may be measured according to ASTM D792.

In embodiments described herein, the ethylene/alpha-olefin elastomers have a melt index ($I_2$) in the range of 0.1 to 30 grams/10 minutes. All individual values and subranges of from 0.1 to 30 grams/10 minutes are included and disclosed herein. For example, in some embodiments, the ethylene/alpha-olefin elastomers may have a melt index ($I_2$)

in the range of 0.1 to 20 grams/10 minutes. In other embodiments, the ethylene/alpha-olefin elastomers may have a melt index ($I_2$) in the range of 0.1 to 15 grams/10 minutes. In further embodiments, the ethylene/alpha-olefin elastomers may have a melt index ($I_2$) in the range of 0.1 to 10 grams/10 minutes. Melt index ($I_2$) may be measured according to ASTM D1238, condition 190° C./2.16 kg.

The ethylene/alpha-olefin elastomer can be incorporated into a cling layer formulation in an amount based on a variety of factors, such as, amounts of other polymers (e.g., ULDPE or ultra-low density polyethylene and VLDPE or very low density polyethylene), desired tack/cling; cost; tack stability during manufacturing, transportation, storage, and/or use conditions. In some embodiments, the ethylene/alpha-olefin elastomer is present in the cling layer in an amount in the range of 10 to 90 percent by weight of the cling layer, in the range of 15 to 90 percent by weight of the cling layer, in the range of 30 to 90 percent by weight of the cling layer, or even in the range of 40 to 85 percent by weight of the cling layer. Of course, all individual values and subranges of 10 to 90 percent by weight of the cling layer are included and disclosed herein.

The cling layer also comprises a polyethylene polymer selected from ULDPE, VLDPE, and combinations thereof. ULDPE and/or VLDPE can be incorporated into cling layer formulations in an amount based on a variety of factors, such as, the amounts of other ingredients (e.g., ethylene/alpha-olefin elastomer) present in the cling layer, desired tack/cling properties in the film; cost; tack stability during manufacturing, transportation, storage, and/or use conditions. In some embodiments, ULDPE and/or VLDPE is present in the cling layer in an amount in the range of 10 to 90 percent by weight of the cling layer, in the range of 20 to 85 percent by weight of the cling layer, in the range of 30 to 70 percent by weight of the cling layer, or even in the range of 35 to 70 percent by weight of the cling layer.

ULDPE or VLDPE comprises, in polymerized form, a majority weight percent of units derived from ethylene, based on the total weight of the ULDPE or VLDPE. The ULDPE or VLDPE may be an interpolymer of ethylene and at least one ethylenically unsaturated comonomer. In some embodiments, the comonomer is a C3-C20 alpha-olefin. In other embodiments, the comonomer is a C3-C8 alpha-olefin. In further embodiments, the C3-C8 alpha-olefin is selected from propylene, 1-butene, 1-hexene, or 1-octene. In even further embodiments, the ULDPE or VLDPE may be an ethylene/propylene copolymer, ethylene/butene copolymer, ethylene/hexene copolymer, or ethylene/octene copolymer.

ULDPE or VLDPE can be made using ZieglerNatta catalyst techniques to provide a desired level of purge fraction. Ziegler-Natta catalysts are described in U.S. Publication Numbers 2008/0038571(Klitzmiller et al.) and 2008/0176981 (Biscoglio et al.), the entirety of which publications are incorporated herein by reference. In some embodiments, Ziegler-Natta catalyzed ULDPE or VLDPE includes a copolymer of ethylene and 3.5 to 10.5 mol percent of at least one comonomer selected from the group consisting of $C_3$-$C_{20}$ α-olefins, dienes, and cycloalkenes. "ULDPE" and "VLDPE" can be used interchangeably. See, e.g., U.S. Publication Number 2008/0038571 (Klitzmiller et al.), the entirety of which is incorporated herein by reference. In some embodiments, VLDPE refers to ULDPEs or VLDPEs that are manufactured by gas phase reaction techniques and ULDPE refers to ULDPEs or VLDPEs that are manufactured by liquid phase (solution) reaction techniques. Suitable ULDPEs include ATTANE™ 4404, available from The Dow Chemical Company. Suitable VLDPEs include DFDB-9042 NT VLDPE, available from The Dow Chemical Company.

In embodiments described herein, the polyethylene polymer has a density of 0.885 to 0.915 g/cc. All individual values and subranges of from 0.885 to 0.915 g/cc are included and disclosed herein. For example, in some embodiments, the polyethylene polymer has a density of 0.885 to 0.910 g/cc. In other embodiments, the polyethylene polymer has a density of 0.890 to 0.915 g/cc. In further embodiments, the polyethylene polymer has a density of 0.890 to 0.912 g/cc. In even further embodiments, the polyethylene polymer has a density of 0.895 to 0.905 g/cc. In even further embodiments, the polyethylene polymer has a density of 0.899 to 0.905 g/cc. Density may be measured according to ASTM D792.

In embodiments described herein, the polyethylene polymer has a melt index ($I_2$) in the range of 0.1 to 30 grams/10 minutes. All individual values and subranges of from 0.1 to 30 grams/10 minutes are included and disclosed herein. For example, in some embodiments, the polyethylene polymer has a melt index ($I_2$) in the range of 0.1 to 25 g/10 minutes. In other embodiments, the polyethylene polymer has a melt index ($I_2$) in the range of 0.1 to 20 g/10 minutes. In further embodiments, the polyethylene polymer has a melt index ($I_2$) in the range of 0.1 to 15 g/10 minutes. In even further embodiments, the polyethylene polymer has a melt index ($I_2$) in the range of 0.1 to 10 g/10 minutes. In even further embodiments, the polyethylene polymer has a melt index ($I_2$) in the range of 0.5 to 10 grams/10 minutes. Melt index ($I_2$) may be measured according to ASTM D1238, condition 190° C./2.16 kg.

In embodiments described herein, the polyethylene polymer may have a molecular weight distribution ($M_w/M_n$) of from 3.0 to 6.0. Molecular weight distribution can be described as the ratio of weight average molecular weight ($M_w$) to number average molecular weight ($M_n$) (i.e., $M_w/M_n$), and can be measured by conventional gel permeation chromatography techniques.

In embodiments described herein, the polyethylene polymer has a purge fraction of greater than 20 percent as determined by the Crystallization Elution Fractionation (CEF) test method. The purge fraction can qualitatively refer to branched (e.g., highly-branched) and non-crystallizable polyolefin copolymers that can be generated during a polymerization process via a Ziegler-Natta catalyst ("Z-N" catalyst), and become part of the final polyethylene product. Without being bound by theory, it is believed that a polyethylene polymer having a purge fraction of at least 20 wt. % as determined by the CEF test method can be blended with ethylene/alpha-olefin elastomer to provide a cling layer with desirable cling properties. In some embodiments, the polyethylene polymer has a purge fraction of greater than 22 percent, or greater than 25 percent. In other embodiments, the polyethylene polymer may have a purge fraction of less than 45 percent, or less than 40 percent. Of course, it should be understood that polyethylene polymers having higher purge fraction amounts may be utilized.

Without being bound by theory, it is believed that the combination of (i) an ethylene/alpha-olefin elastomer and (ii) a polyethylene polymer having a purge fraction greater than 20 percent, can provide similar or enhanced cling in the cling layer as compared to a cling layer having a higher level of PE (polyethylene) elastomer and no polyethylene polymer having a purge fraction greater than 20 percent. Specifically, it is believed that ethylene/alpha-olefin elastomers can give the cling layer a smooth surface (i.e., better surface conformability) while the polyethylene polymer having a purge fraction greater than 20 percent can enable a diffusion mechanism across the polymer interface to form entanglement within the polymer matrix. Reducing the amount of PE elastomer in a cling layer to provide desired cling properties can be advantageous as PE elastomer can be relatively expensive and/or can be difficult to process with blown film techniques when used at relatively high levels (e.g., greater than 90% by weight of a layer) because of its tackiness. Further, the cling layer can have desired cling properties without including polyisobutylene (PIB) (i.e., PIB-free). Eliminating the need for PIB additives can be advantageous as the additives are sometimes subjected to a time consuming aging period to migrate the additive to the surface of the film (i.e., bloom). In addition, the additives can be in liquid form, and therefore, drip to an undue degree from process equipment. Further, the additives may contaminate process equipment, causing an undue amount of noise when unrolling a roll of film, and/or cause two-sided cling where it is not desired.

The polyethylene polymer (ULDPE and/or VLDPE) may be incorporated into the cling layer at a sufficient level to permit a lower amount of ethylene/alpha-olefin elastomer present in the cling layer, while still providing desired cling properties. This can be advantageous as ethylene/alpha-olefin elastomers can be relatively more expensive than the polyethylene polymer (ULDPE and/or VLDPE). In addition, the ethylene/alpha-olefin elastomer can be difficult to process using blown film techniques, particularly, when the ethylene/alpha-olefin elastomer is present at relatively high levels (e.g., greater than 90 wt. %) in the cling layer due to its tackiness. In some embodiments, the cling layer may comprise 30 wt. % to 70 wt. % of the polyethylene polymer (ULDPE and/or VLDPE) and 70 wt. % to 30 wt. % of the ethylene/alpha-olefin elastomer.

Optionally, the cling layer can include one or more additives and/or additional polymers. For example, in some embodiments, the cling layer can optionally include low density polyethylene (LDPE) and/or linear low density polyethylene (LLDPE) as desired. Low density polyethylene can have a density in the range of 0.915 to 0.935 grams/cm$^3$ and a melt index in the range of 0.1 to 30 grams/10 minutes. Linear low density polyethylene can have a density in the range in the range of 0.912 to 0.940 grams/cm$^3$ and a melt index in the range of 0.5 to 30 grams/10 minutes. The cling layer can include LDPE in an amount from 0 to 30 percent by weight of the cling layer. The cling layer can include LLDPE in an amount from 0 to 30 percent by weight of the cling layer. In some embodiments, the cling layer can include LDPE in an amount from 0 to 30 percent by weight of the cling layer and LLDPE in an amount from 0 to 30 percent by weight of the cling layer.

The ethylene/alpha-olefin elastomer can be dry blended with the polyethylene polymer to form a cling layer blend. Methods of dry blending resins can be found in U.S. Pat. No. 3,318,538 (Needham), the entirety of which patent is incorporated herein by reference. The ethylene/alpha-olefin elastomer can also be melt-blended with the polyethylene polymer to form a cling layer blend. Methods of melt blending resins can be found in U.S. Pat. No. 6,111,019 (Arjunan et al.), the entirety of which patent is incorporated herein by reference. The cling layer blend can be used in an extrusion process to form a cling layer via, for e.g., blown film techniques.

Release Layer

The release layer comprises a low density polyethylene (LDPE). In embodiments described herein, the release layer comprises from 50 wt. % to 100 wt. % of the LDPE. All individual values and subranges of from 50 wt. % to 100 wt. % are included and disclosed herein. For example, in some embodiments, the release layer comprises from 55 wt. % to 100 wt. %, 60 wt. % to 100 wt. %, 65 wt. % to 100 wt. %, 70 wt. % to 100 wt. %, 75 wt. % to 100 wt. %, 80 wt. % to 100 wt. %, 85 wt. % to 100 wt. %, 90 wt. % to 100 wt. %, 95 wt. % to 100 wt. %, by weight of the release layer, of the LDPE.

The low density polyethylene may have a density of from 0.915 g/cc to 0.930 g/cc. All individual values and subranges of from 0.915 g/cc to 0.930 g/cc are included and disclosed herein. For example, in some embodiments, the low density polyethylene may have a density of from 0.917 g/cc to 0.930 g/cc, 0.917 g/cc to 0.928 g/cc, 0.917 g/cc to 0.925 g/cc, or 0.919 g/cc to 0.925 g/cc. Density may be measured in accordance with ASTM D792.

The low density polyethylene may have a melt index, or 12, of from 1.0 g/10 min to 30.0 g/10 min. All individual values and subranges of 1.0 g/10 min to 30.0 g/10 min are included and disclosed herein. For example, in some embodiments, the low density polyethylene may have a melt index from 1.0 to 25.0 g/10 min, 1.0 to 20.0 g/10 min, 1.0 to 15.0 g/10 min, 1.0 to 10.0 g/10 min, 1.0 to 8.0 g/10 min, 1.0 to 5.0 g/10 min, 1.0 to 3.0 g/10 min, 1.5 to 2.75 g/10 min, or 1.75 to 2.75 g/10 min Melt index, 12, may be measured in accordance with ASTM D1238 (190° C. and 2.16 kg).

The low density polyethylene may have a molecular weight distribution (MWD or Mw/Mn), as measured by the conventional calibration of triple detector gel permeation chromatography (TDGPC) of from 3.0 to less than 7.0. All individual values and subranges of from 3.0 to less than 7.0 are included and disclosed herein. For example, in some embodiments, the low density polyethylene may have a MWD, as measured by TDGPC, of from 3.0 to 6.8, 3.0 to 6.6, 3.0 to 6.5, 3.5 to 6.6, 3.5 to 6.5, 4.0 to 6.6, or 4.0 to 6.5. The TDGPC test method is outlined below.

In embodiments described herein, the low density polyethylene may have a number average molecular weight, as measured by the conventional calibration of TDGPC, of 10,000 to 20,000 g/mol. All individual values and subranges of 10,000 to 20,000 g/mol are included and disclosed herein. For example, in some embodiments, the low density polyethylene may have a number average molecular weight, as measured by the conventional calibration of TDGPC, of 12,000 to 18,000 g/mol, or 14,000 to 17,000 g/mol.

In embodiments described herein, the low density polyethylene may have a weight average molecular weight, as measured by the conventional calibration of TDGPC, of 75,000 to 95,000 g/mol. All individual values and subranges of 75,000 to 95,000 g/mol are included and disclosed herein. For example, in some embodiments, the low density polyethylene may have a weight average molecular weight, as measured by the conventional calibration of TDGPC, of 77,000 to 93,000 g/mol, or 80,000 to 91,000 g/mol.

In embodiments described herein, the low density polyethylene may have a z average molecular weight, as measured by the conventional calibration of TDGPC, of 250,000 to 300,000 g/mol. All individual values and subranges of 250,000 to 300,000 g/mol are included and disclosed herein. For example, in some embodiments, the low density polyethylene may have a z average molecular weight, as measured by the conventional calibration of TDGPC, of 260,000 to 290,000 g/mol, or 270,000 to 285,000 g/mol.

In embodiments described herein, the low density polyethylene may have an absolute weight average molecular weight, as measured by TDGPC, of 130,000 to 185,000 g/mol. All individual values and subranges of 130,000 to 185,000 g/mol are included and disclosed herein. For example, in some embodiments, the low density polyethylene may have an absolute weight average molecular weight, as measured by TDGPC, of 140,000 to 170,000 g/mol, or 155,000 to 163,000 g/mol.

In embodiments described herein, the low density polyethylene may have an absolute z average molecular weight, as measured by TDGPC, of 1,000,000 to 3,500,000 g/mol. All individual values and subranges of 1,000,000 to 3,500,000 g/mol are included and disclosed herein. For example, in some embodiments, the low density polyethylene may have an absolute z average molecular weight, as measured by TDGPC, of 1,400,000 to 3,300,000 g/mol, or 2,500,000 to 3,500,000 g/mol.

In embodiments described herein, the low density polyethylene may have a Mw(abs)/Mn(conv), as measured by TDGPC, of 1.5 to 2.1. All individual values and subranges of 1.5 to 2.1 are included and disclosed herein. For example, in some embodiments, the low density polyethylene may have a Mw(abs)/Mn(conv), as measured by TDGPC, of 1.6 to 2.1, or 1.7 to 2.05.

In embodiments described herein, the low density polyethylene may have a gpcBR of 1.0 to 1.9. All individual values and subranges of 1.0 to 1.9 are included and disclosed herein. For example, in some embodiments, the low density polyethylene may have a gpcBR, as measured by TDGPC, of 1.3 to 1.8, 1.4 to 1.7, or 1.5 to 1.7.

In embodiments described herein, the low density polyethylene may have a melt strength, measured at 190° C., of from 3 to 10 cN. All individual values and subranges of 3 to 10 cN are included and disclosed herein. For example, in some embodiments, the low density polyethylene may have a melt strength, measured at 190° C., of from 4 to 9 cN, or 4.5 to 9 cN.

In embodiments described herein, the low density polyethylene may have a viscosity at 0.1 rad/s at 190° C. as measured by the dynamic mechanical spectroscopy (DMS) method of from 3,000 to 7,000 Pa-s. All individual values and subranges of 3,000 to 7,000 Pa-s are included and disclosed herein. For example, in some embodiments, the low density polyethylene may have a viscosity at 0.1 rad/s at 190° C. as measured by the dynamic mechanical spectroscopy (DMS) method of from 4,000 to 7,000 Pa-s, or 5,000 to 6,000 Pa-s.

In embodiments described herein, the low density polyethylene may have a viscosity ratio (viscosity at 0.1 rad/s divided by the viscosity at 100 rad/s, both measured at 190° C. using DMS) of from 7 to 15. All individual values and subranges of 7 to 15 are included and disclosed herein. For example, in some embodiments, the low density polyethylene may have a viscosity ratio (viscosity at 0.1 rad/s divided by the viscosity at 100 rad/s, both measured at 190° C. using DMS) of from 8 to 14, 9 to 13, or 10 to 12.

In embodiments described herein, the low density polyethylene may have a tan delta at 0.1 rad/s, as measured at 190° C. using DMS, of from 4.5 to 10. All individual values and subranges of 4.5 to 10 are included and disclosed herein. For example, in some embodiments, the low density polyethylene may have a tan delta at 0.1 rad/s, as measured at 190° C. using DMS, of from 5 to 7, or 5.5 to 6.5.

The LDPE may include branched polymers that are partly or entirely polymerized in autoclave and/or tubular reactors, or any combination thereof, using any type of reactor or reactor configuration known in the art, at pressures above 14,500 psi (100 MPa) with the use of free-radical initiators, such as, peroxides (see, for example, U.S. Pat. No. 4,599,392, which is incorporated herein by reference). In some embodiments, the LDPE may be made in an autoclave process under single phase conditions designed to impart high levels of long chain branching, such as, described in PCT patent publication WO 2005/023912, the disclosure of which is incorporated herein. In some embodiments, the LDPE may be made in an autoclave process in a two phase region to produce a LDPE with narrower molecular weight distribution and less long chain branching resulting in a LDPE with good optical and other film properties. The two phase region in the high pressure autoclave process is generally achieved with lower pressure and can also be achieved through the use of an inert antisolvent, such as nitrogen, in the reaction mixture (Handbook of Vinyl Polymers: Radical Polymerization, Process, and Technology, $2^{nd}$ Edition, Edited by M. K. Mishra and Y. Yagci, CRC Press, p. 382, 2009). In some embodiments, the LDPE may be made in a tubular process under conditions to produce narrower or moderate molecular weight distribution LDPE such as, described in PCT patent publications WO 2011/019563 and WO 2010/042390, the disclosures of which are incorporated herein by reference. In embodiments herein, the LDPE is a homopolymer. In some embodiments, the low density polyethylene does not contain sulfur. In some embodiments, the low density polyethylene contains less than 5 ppm, further less than 2 ppm, further less than 1 ppm and further less than 0.5 ppm sulfur. Exemplary LDPE resins may include, but is not limited to, resins sold by The Dow Chemical Company, such as, LDPE 640I resins, or LDPE 608A. Other exemplary LDPE resins are described in WO 2014/051682 and WO 2012/082393, which are herein incorporated by reference.

In embodiments described herein, the release layer may further comprise a linear low density polyethylene (LLDPE). In some embodiments, the release layer may further comprise a LLDPE present in an amount ranging from 1 wt. % to 100 wt. %, 1 wt. % to 50 wt. %, 1 wt. % to 40 wt. %, 1 wt. % to 30 wt. %, 1 wt. % to 25 wt. %, 5 wt. % to 40 wt. %, 5 wt. % to 30 wt. %, 5 wt. % to 25 wt. %, 10 wt. % to 40 wt. %, 10 wt. % to 30 wt. %, or 10 wt. % to 25 wt. %, by weight of the release layer. The LLDPE may have a density in the range in the range of 0.912 to 0.940 grams/cm³, as measured according to ASTM D792, and a melt index, $I_2$, in the range of 0.5 to 30 grams/10 minutes, as measured according to ASTM D1238, condition 190° C./2.16 kg.

Core Layer

Optionally, a multilayer film described herein can include one or more core layers positioned between the cling layer and the release layer. In some embodiments, the multilayer film comprises a core layer positioned between the cling layer and the release layer. In other embodiments, the multilayer film comprises a single core layer positioned between and contacting at least a portion of the cling layer and the release layer.

The core layer can include one or more of LLDPE, LDPE, ethylene/alpha-olefin elastomer, polypropylene elastomer, and/or ethylene vinyl acetate (EVA). In some embodiments, the core layer comprises LLDPE in an amount from 0 to 100 percent, 25 to 100 percent, 30 to 100 percent, 40 to 100 percent, 50 to 100 percent, 60 to 100 percent, 65 to 100 percent, 70 to 100 percent, 75 to 100 percent, by weight of the core layer. In other embodiments, the core layer comprises LLDPE and one or more of ethylene/alpha-olefin elastomer, polypropylene elastomer, or ethylene vinyl acetate. The one or more of ethylene/alpha-olefin elastomer, polypropylene elastomer, or ethylene vinyl acetate may be present in amounts ranging from 1 to 30 percent, 1 to 25 percent, 1 to 20 percent, or 1 to 15 percent, by weight, of the core layer. In further embodiments, the core layer may comprise LLDPE and LDPE. The LDPE may be present in amounts ranging from 1 to 50 percent, 1 to 35 percent, 1 to 25 percent, or 1 to 20 percent, by weight, of the core layer. Exemplary LLDPE for use in the core layer of a multilayer film is commercially available under the trade names ELITE™, TUFLIN™, and DOWLEX™ from the Dow Chemical Company.

The multilayer films described herein can be made by a variety of techniques, such as, blown film techniques. Methods of making multilayer blown films are described in U.S. Pat. No. 6,521,338 (Maka), the entirety of which patent is incorporated herein by reference. For example, in some embodiments, a multilayer blown film can be made by co-extruding a cling layer composition with the release layer composition (and, optionally, a core layer composition) in an extruder to form a tube having a cling layer and a release layer, and cooling the tube to form a multilayer blown stretch film.

In embodiments described herein, the multilayer films may exhibit a sufficiently high cling level and/or a relatively reduced noise level that may be produced as a roll of the multilayer film is unwound. In some embodiments, the multilayer film exhibits a noise level of less than 90 decibels (dB) when the release layer comprises 100 wt. % LDPE as described herein. In some embodiments, the multilayer film exhibits a cling value of greater than 200 g when the release layer comprises 100 wt. % LDPE as described herein. In some embodiments, the multilayer film exhibits a noise level of less than 90 decibels (dB) and a cling value of greater than 200 g when the release layer comprises 100 wt. % LDPE as described herein.

Embodiments of the multilayer films will now be further described in the following illustrative examples.

Test Methods

Density

Density can be measured in accordance with ASTM D-792.

Melt Index

Melt index ($I_2$) can be measured in accordance with ASTM D-1238, Procedure B (condition 190° C./2.16 kg). Melt index ($I_{10}$) can be measured in accordance with ASTM D-1238, Procedure B (condition 190° C./10.0 kg).

Conventional Gel Permeation Chromatography (GPC)

The chromatographic system consisted of a PolymerChar GPC-IR (Valencia, Spain) high temperature GPC chromatograph equipped with an internal IR5 detector. The autosampler oven compartment was set at 160° Celsius and the column compartment was set at 150° Celsius. The columns used were 3 Agilent "Mixed B" 30 cm 10-micron linear mixed-bed columns and a 10-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene}=A\times(M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left(\frac{RV_{Peak\ Max}}{\text{Peak Width at } \frac{1}{2} \text{ height}}\right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

where RV is the retention volume in milliliters and the peak width is in milliliters, Peak max is the maximum position of the peak, one tenth height is 1/10 height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre-nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum_i IR_i}{\sum_i (IR_i / M_{polyethylene_i})} \quad (EQ\ 4)$$

-continued $$M_w = \frac{\sum_i (IR_i * M_{polyethylene_i})}{\sum_i IR_i} \quad (EQ\ 5)$$

$$M_z = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$Flowrate_{effective} = Flowrate_{nominal} \times \frac{FlowMarker_{Calibration}}{FlowMarker_{Observed}} \quad (EQ\ 7)$$

Triple Detector Gel Permeation Chromatography (TDGPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration and calculation conventional molecular weight moments and the distribution (using the 20 um "Mixed A" columns) were performed according to the method described above analogous to the Conventional GPC procedure using the "Mixed B" columns.

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight (Mw(abs)) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are extrapolated at chromatographic ends where signal to noise becomes low (using GPCOne™). Other respective moments, $Mn_{(Abs)}$ and $Mz_{(Abs)}$ are be calculated according to equations 8-9 as follows:

$$M_{n(Abs)} = \frac{\sum_i IR_i}{\sum_i (IR_i / M_{Absolute_i})} \quad (EQ\ 8)$$

$$M_{z(Abs)} = \frac{\sum_i (IR_i * M_{Absolute_i}^2)}{\sum_i (IR_i * M_{Absolute_i})} \quad (EQ\ 9)$$

The absolute intrinsic viscosity ($IV_{(Abs)}$) is obtained (using GPCOne™) from the Area of the Specific Viscosity (DV) integrated chromatogram (factored by the viscosity constant) divided by the mass recovered (using GPCOne™).

The gpcBR is determined from the TDGPC data as measured above and is calculated as described in WO 2014/051682.

For all of the TPGPC data reported herein, three replicates were run for each sample and averaged; the averaged values are reported herein.

Crystallization Elution Fractionation (CEF) Method

The Crystallization Elution Fractionation (CEF) technology is conducted according to Monrabal et al, Macromol.

Symp. 257, 71-79 (2007). The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 or IR-5 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for at least two hours before use. ODCB is sparged with dried nitrogen ($N_2$) for one hour before use. Dried nitrogen is obtained by passing nitrogen at <90 psig over $CaCO_3$ and 5 Å molecular sieves. ODCB is further dried by adding five grams of the dried silica to two liters of ODCB or by pumping through a column or columns packed with dried silica between 0.1 ml/min to 1.0 ml/min Eight hundred milligrams of BHT are added to two liters of ODCB if no inert gas such as $N_2$ is used in purging the sample vial. Dried ODCB with or without BHT is hereinafter referred to as "ODCB-m." A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The IR-4 or IR-5 signal data is collected at one data point/second.

The CEF column is packed with glass beads at 125 μm±6% (such as those commercially available with acid wash from MO-SCI Specialty Products) with ⅛ inch stainless tubing according to U.S. Pat. No. 8,372,931. The internal liquid volume of the CEF column is between 2.1 ml and 2.3 ml. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

The CEF chromatogram is generally divided into three zones, each zone of which has an elution temperature range. The wt % of the lowest temperature zone is generally called the wt % of Zone 1 or the wt % of the purge fraction. The wt % of the intermediate temperature zone is generally called the wt % of Zone 2 or the wt % of the copolymer fraction. The wt % of the highest temperature zone is generally called the wt % of Zone 3 or the wt % of the high density fraction.

Melt Strength

Melt strength was measured at 190° C. using a Göettfert Rheotens 71.97 (Göettfert Inc.; Rock Hill, S.C.), melt fed with a Göettfert Rheotester 2000 capillary rheometer equipped with a flat entrance angle (180 degrees) of length of 30 mm and diameter of 2.0 mm. The pellets (20-30 gram pellets) were fed into the barrel (length=300 mm, diameter=12 mm), compressed and allowed to melt for 10 minutes before being extruded at a constant piston speed of 0.265 mm/s, which corresponds to a wall shear rate of 38.2 $s^{-1}$ at the given die diameter. The extrudate passed through the wheels of the Rheotens located 100 mm below the die exit and was pulled by the wheels downward at an acceleration rate of 2.4 $mm/s^2$. The force (in cN) exerted on the wheels was recorded as a function of the velocity of the wheels (in mm/s). Melt strength is reported as the plateau force (cN) before the strand broke.

Dynamic Mechanical Spectroscopy (DMS)

The rheology measurement to determine the viscosity at 0.1 rad/s, the viscosity at 100 rad/s, tan delta at 0.1 rad/s, was done in a nitrogen environment, at 190° C., and a strain of 10%. The stamped-out disk was placed between the two "25 mm" parallel plates located in an ARES-1 (Rheometrics SC) rheometer oven, which was preheated, for at least 30 minutes, at 190° C., and the gap of the "25 mm" parallel plates was slowly reduced to 2.0 mm. The sample was then allowed to remain for exactly 5 minutes at these conditions. The oven was then opened, the excess sample was carefully trimmed around the edge of the plates, and the oven was closed. The method had an additional five minute delay built in, to allow for temperature equilibrium. Then the viscosity at 0.1 rad/s, viscosity at 100 rad/s, and tan delta at 0.1 rad/s were measured via a small amplitude, oscillatory shear, according to an increasing frequency sweep from 0.1 to 100 rad/s. The complex viscosity $\eta^*$, tan ($\delta$) or tan delta, viscosity at 0.1 rad/s (V0.1), the viscosity at 100 rad/s (V100), and the viscosity ratio (V0.1/V100) were calculated from these data.

Cling

On-pallet stretch cling (for stretch cling performance) can be measured by Lantech SHS test equipment. The test consists of stretching the film at 200% at a constant force F2 of 8 lbs. for 6 wraps with the turntable running at a rate of 10 rpm. The end of the film is then attached to a load cell which measures the amount of force, in grams, needed to pull the film off the drum.

Noise

The noise level of the films during unwinding can be determined by the Highlight Stretch Film Test Stand (from Highlight Industries). When the film is unwound from the sample roll, a sensor, attached to the apparatus and five inches away from the film roll, measures the noise. The unwinding speed is 355 ft. per minute and the stretch level is 250%.

EXAMPLES

Cling & Core Layers

The resins used in the cling and core layers are shown in Table 1. The resins in Table 1 are available from the Dow Chemical Company.

TABLE 1

Resins Used in the Cling And Core Layers

| Product | Density (g/cm$^3$) | MI (g/10 min) | Purge fraction, as determined by CEF (wt. %) |
|---|---|---|---|
| Resin for cling layer | | | |
| SAMPLE 1 ULDPE | 0.900 | 5.0 | 32 |
| AFFINITY™ EG 8100G PE Elastomer | 0.870 | 1.0 | Not applicable |
| Resin for core layer | | | |
| DOWLEX™ 2045G LLDPE | 0.920 | 1.0 | — |

The core layer consists of 100 wt. % of DOWLEX™ 2045G LLDPE. The cling layer consists of 65 wt. % of AFFINITY™ EG 8100G PE Elastomer and 35 wt. % of SAMPLE 1 ULDPE.

Preparation of the Ziegler-Natta (Z-N) Catalyst to Make Sample 1 ULDPE

The Z-N catalyst was prepared according to the following procedure. Ethylaluminium dichloride (EADC) solution (15 wt. % EADC dissolved in Isopar E (available from Exxon-Mobil Chemical Co., Houston, Tex.)) was transferred into the stirred vessel containing magnesium chloride (MgCl$_2$) slurry (0.2M in Isopar E) and aged while stirring for 6 hours prior to use. Titanium tetraisopropoxide (Ti(OiPr)$_4$) was transferred to the MgCl$_2$/EADC slurry vessel, followed by at least 8 hours of aging to obtain the procatalyst. The ratio of MgCl$_2$:EADC:Ti(OiPr)$_4$ was such that the metal ratio (Mg:Al:Ti) in the procatalyst was 40:12.5:3.

Preparation of Sample 1 ULDPE

A solution polymerization reactor system was used. A hydrocarbon solvent and monomer (ethylene) were injected into the reactor as a liquid. Comonomer (1-octene) was mixed with the liquid solvent. This feed stream was cooled to less than 20° C. before injection into the reactor system. The reactor system was operated at polymer concentrations in excess of 10 wt. %. The adiabatic temperature rise of the solution accounts for the heat removal from the polymerization reactions.

The solvent used in the solution polyethylene process was a high purity iso-paraffinic fraction of C6-C8 hydrocarbons. Fresh 1-octene was purified and mixed with the recycle solvent stream (contained solvent, ethylene, 1-octene, and hydrogen). After mixing with the recycle stream the combined liquid stream was further purified before using a 600-1000 psig pressure feed pump to pump the contents to the reactor. Fresh ethylene was purified and compressed to 600-1000 psig. Hydrogen (a telogen used to reduce molecular weight) and ethylene were flow controlled into the recycle solvent stream and the total feed stream was cooled to the appropriate feed temperature, which can be <40° C. The process used the Ziegler-Natta catalyst described above to catalyze the polymerization reactions. The reactor was operated at pressures >400 psig and temperatures in excess of 70° C. The ethylene conversion was maintained in the reactor by controlling the catalyst injection rate. The residence time was relatively short (less than 30 minutes). The ethylene conversion per reaction pass was greater than 80 wt. % ethylene.

Upon exiting the reactor, water and antioxidant additives were injected in the polymer solution. The water hydrolyzed the catalyst, terminating the polymerization reaction. Some of the additives such as antioxidants remained with the polymer and function as stabilizers to prevent polymer degradation. The post reactor solution was superheated from reactor temperature (>70 Deg C.) to 210-260 Deg C. in preparation for a two-stage devolatization to recover the solvent and unreacted monomers. Residual volatiles in the polymer were less than 2,000 ppm by weight. The polymer melt was pumped to a die for underwater pellet cutting.

Release Layer

The release layer consists of a blend of a low density polyethylene and, optionally, a linear low density polyethylene (DOWLEX™ 2045G available from The Dow Chemical Company) having a density of 0.920 g/cc and a melt index, I2, of 1.0. The LDPE resins used in the release layer are shown in Table 2 below. All LDPE resins are available from The Dow Chemical Company.

TABLE 2

LDPE Resins Used in the Release Layer

| Resin | Product | Density (g/cm$^3$) | MI (g/10 min) | Mw/Mn (conv) from TDGPC* |
|---|---|---|---|---|
| Inv. 1 | LDPE 640I | 0.920 | 2.0 | 6.27 |
| Inv. 2 | LDPE 608A | 0.923 | 2.6 | 4.89 |
| Comp. A | LDPE 501I | 0.922 | 1.9 | 7.09 |
| Comp. B | LDPE 535I | 0.923 | 1.9 | 7.08 |
| Comp. C | LDPE 621I | 0.918 | 2.3 | 10.64 |
| Comp. D | AGILITY™ 1001 | 0.920 | 0.65 | 8.61 |

*From the conventional calibration of TDGPC

TABLE 3

LDPE Resins Used in the Release Layer: Additional TDGPC Data

| Resin | Mn (conv.) (g/mol) | Mw (conv.) (g/mol) | Mz (conv.) (g/mol) | Mw (abs) | Mz (abs) | Mw(abs)/ Mw(conv) | gpcBR |
|---|---|---|---|---|---|---|---|
| Inv. 1 | 14,419 | 90,334 | 276,509 | 157,867 | 1,478,383 | 1.75 | 1.55 |
| Inv. 2 | 16,682 | 81,556 | 282,523 | 159,677 | 3,160,177 | 1.96 | 1.63 |
| Comp. A | 12,659 | 89,706 | 352,723 | 190,089 | 3,456,205 | 2.12 | 1.93 |
| Comp. B | 12,739 | 90,112 | 353,127 | 192,416 | 3,715,369 | 2.13 | 1.91 |
| Comp. C | 18,856 | 200,689 | 786,845 | 607,446 | 4,488,449 | 3.03 | 4.32 |
| Comp. D | 13,233 | 111,961 | 436,630 | 250,067 | 3,906,557 | 2.23 | 2.14 |

TABLE 4

LDPE Resins Used in the Release Layer: Melt Strength and DMS Rheology Data at 190 C.

| Resin | Melt Strength (cN) | Viscosity 0.1 rad/s (Pa-s), 190° C. | Visc 0.1/100, 190° C. | Tan Delta 0.1 rad/s, 190° C. |
|---|---|---|---|---|
| Inv. 1 | 8.4 | 5,833 | 10.93 | 6.09 |
| Inv. 2 | 4.9 | 5,414 | 11.61 | 6.04 |
| Comp. A | 6.9 | 7,837 | 15.22 | 4.18 |
| Comp. B | 7.6 | 8,049 | 16.05 | 3.84 |
| Comp. C | 16.5 | 6,250 | 16.29 | 2.95 |
| Comp. D | 11.3 | 18,984 | 30.92 | 2.00 |

Films

Three layer blown films were made using a Hosokawa Alpine 7-layer blown film line. The cling layer (outside of the bubble) with a layer ratio of 15% is produced from extruder 1. The core layer with a layer ratio of 70% is produced from extruder 2, 3, 4, 5 and 6. The release layer (inside of the bubble) with a layer ratio of 15% is produced from extruder 7. All extruders are groove-feed and the L/D ratio is 30 with a diameter of 50 mm. The melt temperature of extrusion for all extruders ranged from 450 to 480° F. and the die temperature is 450° F. The die gap is 78.7 mil. The blow up ratio is 2.5 and the film gauge is 1 mil. The output rate is 300 lbs/hr. The film structures are further outlined in Table 5 below.

TABLE 5

Blown Film Structures

| | Cling Layer (15% of Overall Film) | Core Layer (70% of Overall Film) | Release Layer (15% of Overall Film) |
|---|---|---|---|
| Inv. Film 1 | 65 wt. % AFFINITY ™ 8100G 35 wt. % Sample 1 ULDPE | 100 wt. % DOWLEX ™ 2045G | 25 wt. % Inv. 1 75 wt. % DOWLEX ™ 2045G |
| Inv. Film 2 | 65 wt. % AFFINITY ™ 8100G 35 wt. % Sample 1 ULDPE | 100 wt. % DOWLEX ™ 2045G | 50 wt. % Inv. 1 50 wt. % DOWLEX ™ 2045G |
| Inv. Film 3 | 65 wt. % AFFINITY ™ 8100G 35 wt. % Sample 1 ULDPE | 100 wt. % DOWLEX ™ 2045G | 75 wt. % Inv. 1 25 wt. % DOWLEX ™ 2045G |
| Inv. Film 4 | 65 wt. % AFFINITY ™ 8100G 35 wt. % Sample 1 ULDPE | 100 wt. % DOWLEX ™ 2045G | 100 wt. % Inv. 1 |
| Inv. Film 5 | 65 wt. % AFFINITY ™ 8100G 35 wt. % Sample 1 ULDPE | 100 wt. % DOWLEX ™ 2045G | 25 wt. % Inv. 2 75 wt. % DOWLEX ™ 2045G |
| Inv. Film 6 | 65 wt. % AFFINITY ™ 8100G 35 wt. % Sample 1 ULDPE | 100 wt. % DOWLEX ™ 2045G | 50 wt. % Inv. 2 50 wt. % DOWLEX ™ 2045G |
| Inv. Film 7 | 65 wt. % AFFINITY ™ 8100G 35 wt. % Sample 1 ULDPE | 100 wt. % DOWLEX ™ 2045G | 75 wt. % Inv. 2 25 wt. % DOWLEX ™ 2045G |
| Inv. Film 8 | 65 wt. % AFFINITY ™ 8100G 35 wt. % Sample 1 ULDPE | 100 wt. % DOWLEX ™ 2045G | 100 wt. % Inv. 2 |
| Comp. Film 1 | 65 wt. % AFFINITY ™ 8100G 35 wt. % Sample 1 ULDPE | 100 wt. % DOWLEX ™ 2045G | 25 wt. % Comp. A 75 wt. % DOWLEX ™ 2045G |
| Comp. Film 2 | 65 wt. % AFFINITY ™ 8100G 35 wt. % Sample 1 ULDPE | 100 wt. % DOWLEX ™ 2045G | 50 wt. % Comp. A 50 wt. % DOWLEX ™ 2045G |
| Comp. Film 3 | 65 wt. % AFFINITY ™ 8100G 35 wt. % Sample 1 ULDPE | 100 wt. % DOWLEX ™ 2045G | 75 wt. % Comp. A 25 wt. % DOWLEX ™ 2045G |
| Comp. Film 4 | 65 wt. % AFFINITY ™ 8100G 35 wt. % Sample 1 ULDPE | 100 wt. % DOWLEX ™ 2045G | 100 wt. % Comp. A |
| Comp. Film 5 | 65 wt. % AFFINITY ™ 8100G 35 wt. % Sample 1 ULDPE | 100 wt. % DOWLEX ™ 2045G | 25 wt. % Comp. B 75 wt. % DOWLEX ™ 2045G |

TABLE 5-continued

Blown Film Structures

| | Cling Layer (15% of Overall Film) | Core Layer (70% of Overall Film) | Release Layer (15% of Overall Film) |
|---|---|---|---|
| Comp. Film 6 | 65 wt. % AFFINITY ™ 8100G 35 wt. % Sample 1 ULDPE | 100 wt. % DOWLEX ™ 2045G | 50 wt. % Comp. B 50 wt. % DOWLEX ™ 2045G |
| Comp. Film 7 | 65 wt. % AFFINITY ™ 8100G 35 wt. % Sample 1 ULDPE | 100 wt. % DOWLEX ™ 2045G | 75 wt. % Comp. B 25 wt. % DOWLEX ™ 2045G |
| Comp. Film 8 | 65 wt. % AFFINITY ™ 8100G 35 wt. % Sample 1 ULDPE | 100 wt. % DOWLEX ™ 2045G | 100 wt. % Comp. B |
| Comp. Film 9 | 65 wt. % AFFINITY ™ 8100G 35 wt. % Sample 1 ULDPE | 100 wt. % DOWLEX ™ 2045G | 25 wt. % Comp. C 75 wt. % DOWLEX ™ 2045G |
| Comp. Film 10 | 65 wt. % AFFINITY ™ 8100G 35 wt. % Sample 1 ULDPE | 100 wt. % DOWLEX ™ 2045G | 50 wt. % Comp. C 50 wt. % DOWLEX ™ 2045G |
| Comp. Film 11 | 65 wt. % AFFINITY ™ 8100G 35 wt. % Sample 1 ULDPE | 100 wt. % DOWLEX ™ 2045G | 75 wt. % Comp. C 25 wt. % DOWLEX ™ 2045G |
| Comp. Film 12 | 65 wt. % AFFINITY ™ 8100G 35 wt. % Sample 1 ULDPE | 100 wt. % DOWLEX ™ 2045G | 100 wt. % Comp. C |
| Comp. Film 13 | 65 wt. % AFFINITY ™ 8100G 35 wt. % Sample 1 ULDPE | 100 wt. % DOWLEX ™ 2045G | 25 wt. % Comp. D 75 wt. % DOWLEX ™ 2045G |
| Comp. Film 14 | 65 wt. % AFFINITY ™ 8100G 35 wt. % Sample 1 ULDPE | 100 wt. % DOWLEX ™ 2045G | 50 wt. % Comp. D 50 wt. % DOWLEX ™ 2045G |
| Comp. Film 15 | 65 wt. % AFFINITY ™ 8100G 35 wt. % Sample 1 ULDPE | 100 wt. % DOWLEX ™ 2045G | 75 wt. % Comp. D 25 wt. % DOWLEX ™ 2045G |
| Comp. Film 16 | 65 wt. % AFFINITY ™ 8100G 35 wt. % Sample 1 ULDPE | 100 wt. % DOWLEX ™ 2045G | 100 wt. % Comp. D |

TABLE 4

The Effect of Release Layer Formulation on Stretch Cling & Noise Performance

| Film # | Cling Force (g) per 20 inch film width | Noise (dB) |
|---|---|---|
| Inv. Film 1 | 267.3 | 116.0 |
| Inv. Film 2 | 283.6 | 115.4 |
| Inv. Film 3 | 275.9 | 106.7 |
| Inv. Film 4 | 251.9 | 80.4 |
| Inv. Film 5 | 259.5 | 117.3 |
| Inv. Film 6 | 276.5 | 115.5 |
| Inv. Film 7 | 250.0 | 107.9 |
| Inv. Film 8 | 208.1 | 83.2 |
| Comp. Film 1 | 269.7 | 118.1 |
| Comp. Film 2 | 225.5 | 114.2 |
| Comp. Film 3 | 218.8 | 105.1 |
| Comp. Film 4 | 175.0 | 82.2 |
| Comp. Film 5 | 282.7 | 118.1 |
| Comp. Film 6 | 274.8 | 114.2 |
| Comp. Film 7 | 262.5 | 105.1 |
| Comp. Film 8 | 169.7 | 77.7 |
| Comp. Film 9 | 269.0 | 118.0 |
| Comp. Film 10 | 116.8 | 112.1 |
| Comp. Film 11 | 85.2 | 100.9 |
| Comp. Film 12 | 29.2 | 83.2 |
| Comp. Film 13 | 279.8 | 118.4 |
| Comp. Film 14 | 253.5 | 115.1 |
| Comp. Film 15 | 209.6 | 101.1 |
| Comp. Film 16 | 110.2 | 80.3 |

The inventive films show a good combination of low noise values and sufficiently high cling force, whereas the comparative films show a significant decrease in cling force, particularly as the amount of LDPE present in the release layer increases.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A multilayer stretch-cling, blown film comprising a cling layer and a release layer, wherein:
    the cling layer comprises:
        (i) an ethylene/alpha-olefin elastomer having a density in the range of 0.855 to 0.890 g/cc and a melt index, I2, in the range of 0.1 to 30 grams/10 minutes; and
        (ii) a polyethylene polymer selected from ultra-low density polyethylene, a very low density polyethylene, or combinations thereof, wherein the polyethylene polymer has a density in the range 0.885 to 0.915 g/cc, a melt index, I2, in the range of 0.1 to 30 grams/10 minutes, and a purge fraction greater than 20 percent as determined by the Crystallization Elution Fractionation (CEF) test method; and
    the release layer comprises a low density polyethylene (LDPE) having a density of from 0.915 to 0.930 g/cc, a melt index, I2, of from 1.0 to 30.0 g/10 min, and a molecular weight distribution, Mw/Mn, as measured by the conventional calibration of triple detector gel permeation chromatography, of from 3.0 to less than 7.0.

2. The film of claim 1, wherein the release layer comprises from 85 wt. % to 100 wt. % of the LDPE.

3. The film of claim 1, wherein the low density polyethylene has a number average molecular weight, as measured by the conventional calibration of TDGPC, of 10,000 to 20,000 g/mol.

4. The film of claim 1, wherein the low density polyethylene has a Mw(abs)/Mw(conv), as measured by TDGPC, of 1.5 to 2.1.

5. The film of claim 1, wherein the low density polyethylene has a gpcBR, as measured by TDGPC, of 1.0 to 1.9.

6. The film of claim 1, wherein the low density polyethylene has a viscosity ratio (viscosity at 0.1 rad/s divided by the viscosity at 100 rad/s, both measured at 190° C. using dynamic mechanical spectroscopy) of from 7 to 15.

7. The film of claim 1, wherein the low density polyethylene has a tan delta at 0.1 rad/s, as measured at 190° C. using dynamic mechanical spectroscopy of 4.5 to 10.

8. The film of claim 1, wherein the release layer further comprises a linear low density polyethylene.

9. The film of claim 1, wherein the cling layer comprises from 20 wt. % to 100 wt. % of the ethylene/alpha-olefin elastomer.

10. The film of claim 1, wherein the film further comprises a core layer positioned between the cling layer and the release layer.

11. The film of claim 1, wherein the cling layer has a thickness that is from 10-30 percent of the overall thickness of the film.

12. The film of claim 1, wherein the release layer has a thickness that is from 10-30 percent of the overall thickness of the film.

13. The film of claim 1, wherein the film exhibits a cling value of greater than 200 g when the release layer comprises 100 wt. % LDPE.

14. The film of claim 8, wherein the film exhibits a noise level of less than 90 dB when the release layer comprises 100 wt. % LDPE.

15. A method of making the multilayer film according to any one of the previous claims, wherein the method comprises:
    coextruding the cling layer composition with the release layer composition in an extruder to form a tube having a cling layer and a release layer; and
    cooling the tube to form a multilayer blown stretch film.

* * * * *